Patented Sept. 21, 1926.

1,600,772

UNITED STATES PATENT OFFICE.

WILLIAM J. O'BRIEN, OF BALTIMORE, MARYLAND, ASSIGNOR TO THE GLIDDEN COMPANY, OF BALTIMORE, MARYLAND, A CORPORATION OF OHIO.

LITHOPONE AND PROCESS FOR PRODUCING THE SAME.

No Drawing.    Application filed September 26, 1924. Serial No. 740,086.

The present invention relates to an improved lithopone, and the processes for producing the same.

As is well known, in the production of ordinary commercial lithopone, a solution of zinc sulphate ($ZnSO_4$) and barium sulphide, (BaS) are employed, and a co-precipitate of zinc sulphide (ZnS) and barium sulphate ($BaSO_4$) is obtained. The precipitate is treated in accordance with the well known practice in the art, for the production of lithopone.

I am aware of the fact that attempts have heretofore been made to improve the character of lithopone. For instance, ultra marine blue has been added to the same to improve its color. To improve its light resistance, phosophates or alkaline earths, have been added.

I have discovered that the properties of the lithopone may be greatly improved by the addition thereto of a titanium compound, such as titanium oxide ($TiO_2$).

The manner in which the titanium compound is to be combined with the lithopone, may vary.

I have found that satisfactory results are obtainable by combining the dry powdered titanium compound, such as titanium oxide with the dry powdered lithopone pigment. The dry powdered mass is thoroughly stirred in a suitable mixing apparatus. I prefer to employ from about five to twenty parts by weight of the titanium compound, and from about eighty to ninety-five parts by weight of the lithopone pigment. The product obtained by this method is ready for shipment.

I may also place the titanium compound, such as titanium oxide, in suspension in water, and combine and thoroughly mix the same with the lithopone, also suspended in water. In this process, the proportions by weight of the titanium compound, and of the lithopone, are preferably the same as those stated in the first process of combining. The mixture so obtained is filter pressed, dried, and ground to a powder, and is ready for shipment.

I also contemplate adding the titanium compound, such as titanium oxide, to a zinc sulphate solution, for producing a suspension in such solution. The barium sulphide solution is now introduced into the suspension of the titanium compound, in the zinc sulphate solution, and the mass is thoroughly stirred. A co-precipitate of zinc sulphide and barium sulphate is obtained, with the titanium compound carried down. The titanium compound is preferably added in such proportions that from about five to twenty parts by weight will be present in the final product, and the lithopone pigment will be present in about eighty to ninety-five parts by weight.

The mixture thus obtained is filter pressed, dried, and subjected to the usual process for making lithopone.

I also contemplate adding the titanium compound, such as titanium oxide, either in suspension or in the powdered form, to freshly precipitated lithopone. In either case the mixture obtained is filter pressed, dried, and put through the usual procedure followed in making lithopone. In this process, the titanium compound is added in such proportions that it is present in the final product in from five to twenty parts by weight, while the lithopone is present in from eighty to ninety-five parts by weight.

The improved lithopone pigment produced, is a fine white lithopone, containing from about five to twenty per cent by weight of the titanium compound, with respect to the total weight of the mass. The product has a high resistance to light, and a greatly increased covering capacity, with a marked improvement over the ordinary commercial lithopone, with respect to weather resistance. It also shows a marked improvement in behavior when ground with oils, as it does not tend to liver or harden.

It is to be understood that the forms of my invention herewith shown and described, are to be taken as preferred examples of the same, and that various changes may be resorted to in the order of the steps of the methods, and that chemical equivalents may be employed, without departing from the spirit of my invention, or the scope of the subjoined claims.

Having thus described my invention, I claim :—

1. A pigment for use as ordinary commercial lithopone and having a greater covering capacity and offering a greater resistance to the action of light and weather, comprising lithopone and a titanium oxide.

2. A pigment for use as ordinary commercial lithopone and having a greater covering capacity and offering a greater resistance to the action of light and weather than the said commercial lithopone, comprising lithopone and titanium oxide, the lithopone being present in a preponderance by weight.

3. A pigment comprising lithopone, and titanium oxide, the lithopone being present in a preponderance by weight.

4. A pigment comprising approximately from eighty to ninety-five parts by weight of lithopone, and approximately from five to twenty parts by weight of titanium oxide.

5. The method of producing an improved lithopone pigment, comprising the steps of mixing titanium oxide and lithopone.

6. The method of producing an improved lithopone pigment, comprising the steps of mixing a suspension of titanium oxide in water with a suspension of lithopone in water.

7. The method of producing a lithopone pigment comprising mixing titanium oxide suspended in water with lithopone suspended in water, filter pressing the resultant suspension, and drying and grinding the same.

8. The method of producing an improved lithopone pigment, comprising suspending titanium oxide in water, suspending lithopone in water and mixing the same with the suspended titanium oxide, filter pressing the resultant suspension, and drying and grinding the same.

In testimony whereof I affix my signature.

WILLIAM J. O'BRIEN.